United States Patent
Boyd et al.

(10) Patent No.: US 9,807,933 B2
(45) Date of Patent: Nov. 7, 2017

(54) SENSOR EQUIPPED AGRICULTURAL HARVESTER

(71) Applicant: CNH Industrial America LLC, New Holland, PA (US)

(72) Inventors: Robert S. Boyd, Mount Joy, PA (US); Matthew D. Weeks, Troupsburg, NY (US)

(73) Assignee: CNH Industrial America LLC, New Holland, PA (US)

( * ) Notice: Subject to any disclaimer, the term of this patent is extended or adjusted under 35 U.S.C. 154(b) by 12 days.

(21) Appl. No.: 14/881,329

(22) Filed: Oct. 13, 2015

(65) Prior Publication Data

US 2016/0106038 A1    Apr. 21, 2016

Related U.S. Application Data

(60) Provisional application No. 62/066,059, filed on Oct. 20, 2014.

(51) Int. Cl.

| *A01D 41/127* | (2006.01) |
|---|---|
| *A01D 41/14* | (2006.01) |
| *A01D 34/00* | (2006.01) |
| *A01D 101/00* | (2006.01) |

(52) U.S. Cl.
CPC ......... *A01D 41/141* (2013.01); *A01D 34/006* (2013.01); *A01D 41/127* (2013.01); *A01D 2101/00* (2013.01)

(58) Field of Classification Search
CPC ..... A01B 63/145; A01B 69/002; A01B 76/00; A01B 79/005; A01C 21/005; A01D 41/127; A01D 41/1274; A01D 41/1271; A01D 45/021; A01D 43/085; A01D 34/006; A01D 41/141; A01D 2101/00; G01L 1/00; G01L 5/0061; G01N 33/24; G05D 1/0077; G05D 1/0274; G05D 1/0297
USPC ................... 56/10.2 C, 10.2 D, 10.2 R, 10.4; 172/2–9; 701/50
See application file for complete search history.

(56) References Cited

U.S. PATENT DOCUMENTS

| 4,507,910 | A | 4/1985 | Thornley et al. |
|---|---|---|---|
| 4,573,124 | A | 2/1986 | Seiferling |
| 5,155,984 | A | 10/1992 | Sheehan |
| 5,884,224 | A | * 3/1999 | McNabb ................. A01G 7/00 |
| | | | 700/284 |
| 5,961,573 | A | 10/1999 | Hale et al. |

(Continued)

FOREIGN PATENT DOCUMENTS

| DE | 10346541 A1 | 7/2005 |
|---|---|---|
| EP | 0786200 A2 | 7/1997 |

(Continued)

*Primary Examiner* — Robert Pezzuto
(74) *Attorney, Agent, or Firm* — Patrick Sheldrake

(57) ABSTRACT

An agricultural harvester includes a chassis; at least one ground engaging traction member held by the chassis; a cutter held by the chassis; a sensor held by the agricultural harvester so that the sensor is directed in front of the cutter and configured to emit and receive sound and/or radio waves and produce a plurality of output signals; and an electrical processing circuit coupled to the sensor. The electrical processing circuit is configured to produce a field map from the plurality of output signals and adjust an operating parameter of the agricultural harvester based on the field map.

20 Claims, 18 Drawing Sheets

(56) References Cited

U.S. PATENT DOCUMENTS

| | | | |
|---|---|---|---|
| 6,008,756 A | * | 12/1999 | Boerhave ............ A01B 79/005 342/357.52 |
| 6,516,595 B2 | | 2/2003 | Rhody et al. |
| 6,584,390 B2 | | 6/2003 | Beck |
| 6,615,570 B2 | | 9/2003 | Beck et al. |
| 6,791,488 B2 | | 9/2004 | Diekhans et al. |
| 6,826,894 B2 | | 12/2004 | Thiemann et al. |
| 7,992,369 B2 | | 8/2011 | Coers et al. |
| 9,301,446 B2 | | 4/2016 | Peters et al. |
| 2009/0037059 A1 | | 2/2009 | Huster et al. |
| 2013/0116883 A1 | | 5/2013 | Kormann |

FOREIGN PATENT DOCUMENTS

| | | |
|---|---|---|
| EP | 0887660 A2 | 12/1998 |
| EP | 1709859 A1 | 10/2006 |
| EP | 2143316 A1 | 1/2010 |
| EP | 2517549 A1 | 10/2012 |
| EP | 2586304 A1 | 5/2013 |

* cited by examiner

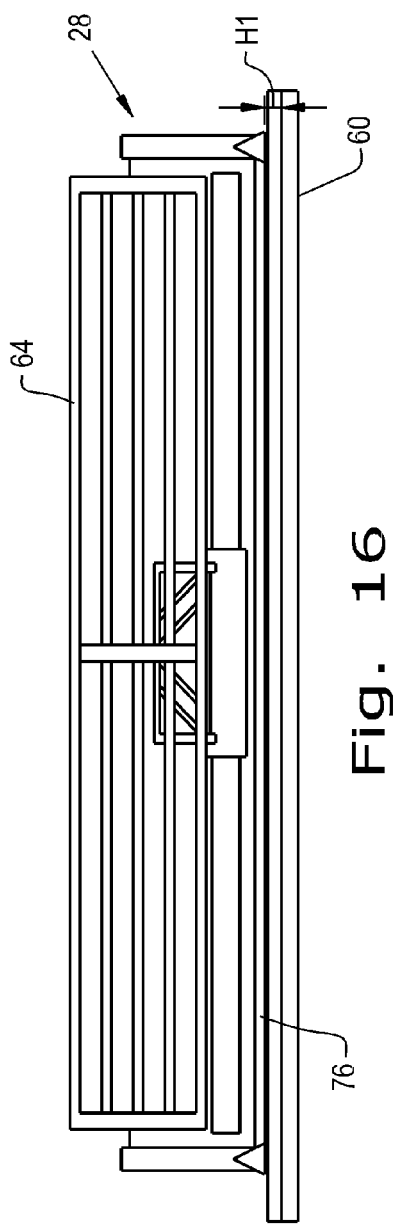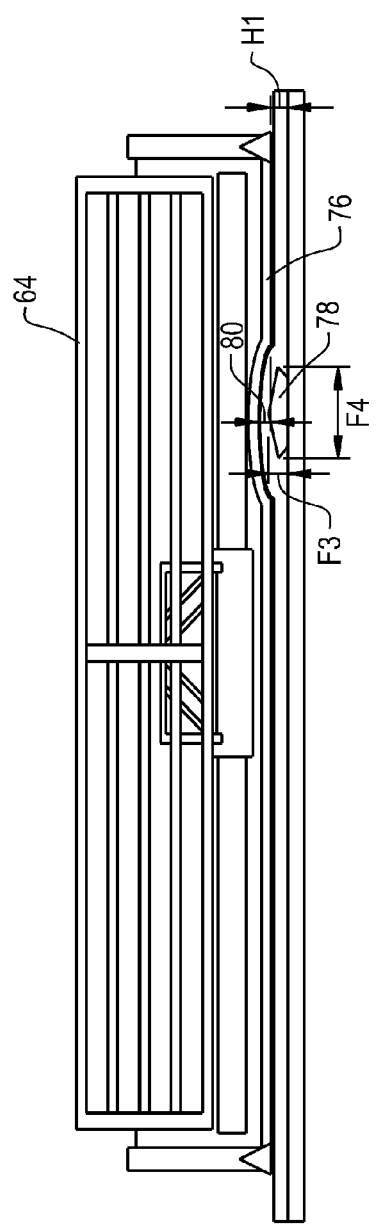

SENSOR EQUIPPED AGRICULTURAL HARVESTER

This application claims the benefit of and priority to U.S. Provisional Application No. 62/066,059, filed Oct. 20, 2014, entitled SENSOR EQUIPPED AGRICULTURAL HARVESTER, which is hereby incorporated by reference in its entirety.

BACKGROUND OF THE INVENTION

Field of the Invention

The present invention relates to agricultural harvesters, and, more particularly, to agricultural harvesters equipped with sensors.

Description of the Related Art

Agricultural harvesters, such as combine harvesters, are known that include a cutter to cut through crop material and enable processing of the crop material to separate valuable crop material from non-valuable crop material. To cut through crop material, the cutter is typically mounted on a front of the agricultural harvester and driven through a field of crops so that a cutting surface of the cutter comes in contact with the crops. The cutting surface slices through the crops, severing the portion of the crop material above the cut from the portion of the crop in the ground. The severed portion of the crop material can then go through a feeder of the agricultural harvester to other systems of the agricultural harvester such as threshing, cleaning and residue systems.

Typically, the operating parameters of the agricultural harvester are manually input by the harvester's operator. Since each crop and associated crop conditions can vary during harvesting season, the agricultural harvester's operating parameters need to be adjusted constantly to optimize harvesting efficiency. The operating parameters are usually optimized through trial and error, which can lead to valuable crop material being ruined and limited harvesting time being wasted. Both occurrences reduce the amount of valuable crop material that can be harvested during the harvesting season.

Another concern when adjusting operating parameters is the presence of foreign objects, such as large rocks, in the field where the agricultural harvester is harvesting crops. These foreign objects can damage the agricultural harvester's cutter, leading to a dulled cutting surface that makes harvesting operations less efficient. In more serious cases, the foreign object can actually be scooped or fed into the agricultural harvester and make its way into the rotor which can result in expensive repairs and extensive downtime.

One known system for controlling the header of an agricultural harvester is described in U.S. Pat. No. 6,615,570. The described system includes a sensor mounted on the agricultural harvester for predicting ground contour of an area that is in front of the header. The predicted ground contour can be used to keep a header of the agricultural harvester a desired height above the ground contour or below the crop heads. The height of the crop heads is preselected as a set distance from the ground, which does not take into account that differing parts of a field may have sections with crops that have higher or lower crop heads. Another known system is described in U.S. Pat. No. 4,507,910 that includes an automatic height control system for a header on a farm implement. The height of the header is continuously controlled in response to the height of the crop that is being harvested, which is determined using sonar to detect the top of the crop. This system assumes the bottom of the crop head to be a preselected distance from the top of the crop, which may lead to excessive non-valuable crop material being harvested if the preselected distance is too large and not all of the valuable crop material being harvested if the preselected distance is too small.

What is needed in the art is an agricultural harvester that can increase the efficiency of harvesting operations.

SUMMARY OF THE INVENTION

The present invention provides an agricultural harvester with one or more sensors that can be used to determine the height of crop heads relative to the ground based on density or the height and location of foreign objects that could potentially damage the agricultural harvester. These determinations are used to produce a field map that can be utilized to adjust one or more operating parameters of the agricultural harvester to increase the agricultural harvester's efficiency.

The invention in one form is directed to an agricultural harvester that includes a chassis; at least one ground engaging traction member held by the chassis; a cutter held by the chassis; a sensor held by the agricultural harvester so that the sensor is directed in front of the cutter and is configured to emit and receive sound and/or radio waves and produce a plurality of output signals; and an electrical processing circuit coupled to the sensor that is configured to produce a field map from the plurality of output signals and adjust an operating parameter of the agricultural harvester based on the field map.

The invention in another form is directed to a method of controlling an agricultural harvester that includes providing a sensor mounted to the agricultural harvester that is directed toward an area in front of a cutter of the agricultural harvester; emitting radio and/or sound waves from the sensor; receiving the radio and/or sound waves; producing a field map based on the received radio and/or sound waves; and adjusting an operating parameter of the agricultural harvester based on the produced field map.

An advantage of the present invention is that the operating parameters of the agricultural harvester can be automatically adjusted to reduce wasted time and ruined valuable crop material that result from adjusting the operating parameters through trial and error.

Another advantage is that the throughput of the agricultural harvester can be adjusted to optimize valuable crop harvesting as well as residue spreading.

Yet another advantage is that damage to the cutter caused by foreign objects can be avoided without causing uneven cuts in the field.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 16 is a perspective view of a cutter of the agricultural harvesters shown in FIGS. 2 and 3 being driven over a field;

FIG. 17 is a perspective view of a cutter of the agricultural harvesters shown in FIGS. 2 and 3 with a flexed cutter bar to avoid contacting a foreign object in the path of the cutter;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
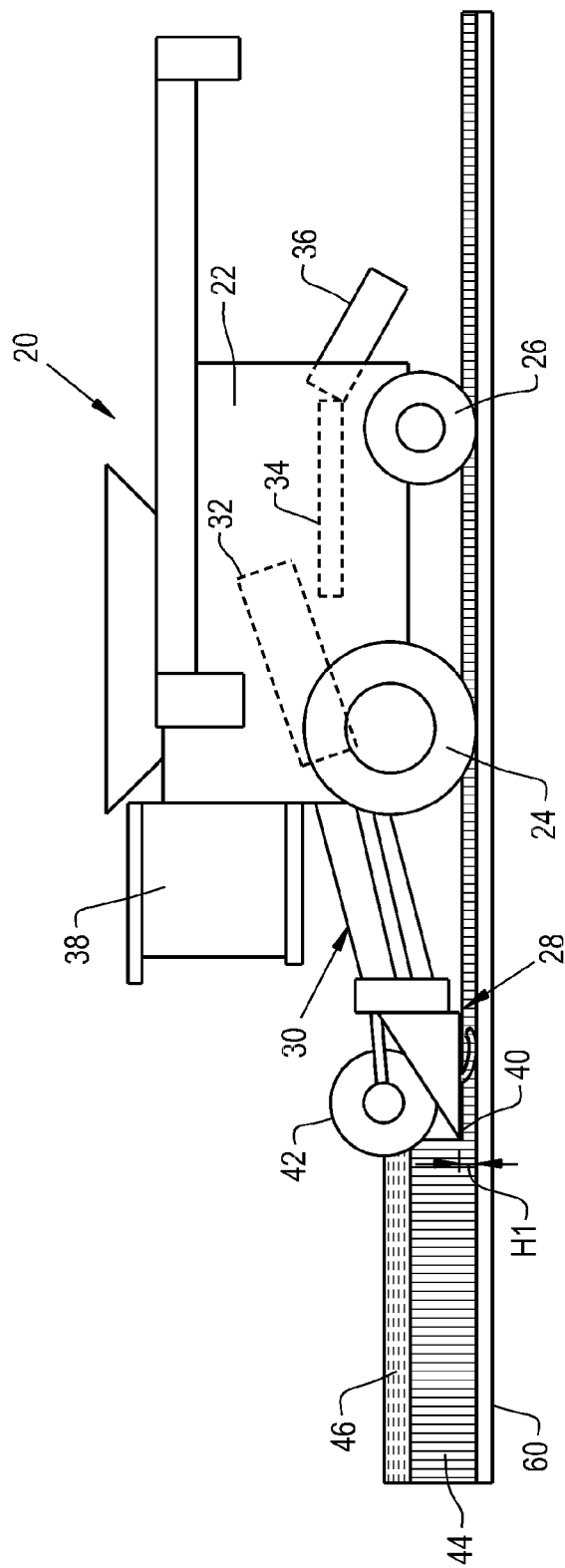
FIG. 1 is a perspective view of a prior art agricultural harvester.

Referring now to the drawings, and more particularly to FIG. 1, there is shown an agricultural harvester 20 of the prior art which generally includes a chassis 22, wheels 24 and 26 held by the chassis 22, and a cutter 28 held by the chassis 22. As shown in FIG. 1, the agricultural harvester 20 is a combine harvester that includes a feeder 30 connected to the cutter 28, a threshing system 32 supplied with cut crop material from the feeder 30, a cleaning system 34 that receives crop material from the threshing system 32, and a residue system 36 that exits out the back of the combine harvester 20 to distribute residue on the field where the combine harvester 20 is harvesting crop material. While the agricultural harvester 20 is shown as a combine harvester configured to harvest and separate grain from material other than grain (MOG), an agricultural harvester of the present invention could also be embodied as other types of crop material harvesters including a forage harvester, a swather, a cotton harvester, and other types of crop gathering devices. The threshing system 32, cleaning system 34 and residue system 36 are represented as rectangular boxes to signify that any type of threshing system 32, cleaning system 34 and residue system 36 can be used according to the present invention. As shown, the combine harvester 20 has a larger front wheel 24 and a smaller back wheel 26, but this configuration could be reversed or the wheels 24 and 26 could be the same size. The wheels 24, 26 are driven by a power source (not shown), such as an internal combustion engine, through a transmission (not shown) to propel the combine harvester 20 in a desired direction of travel. The combine harvester 20 also includes a cabin 38 where an operator will sit during harvesting and a control panel (not shown) for the combine harvester 20 can be located so that the operator can conveniently adjust various operating parameters of the combine harvester 20 during the harvesting operation.

As shown, the cutter 28 is a header with a cutting surface 40, which can be one or more cutter bars, located at the front of the cutter 28. As used herein, the terms "front" and "back" are used to describe relative locations on the combine harvester 20 for convenience of describing the illustrated embodiments and are not intended to limit the scope of the invention to any particular configuration. While the cutter 28 is shown as a header, other types of cutters could be used that effectively separate crop material from growing crops or the ground where the crop material is located. The header 28 includes a cylindrical header reel 42 that rotates and directs crop material from growing crops toward the cutting surface 40, allowing for the crop material to be separated from the growing crops and directed toward the feeder 30 that will supply the cut crop material to the other systems of the combine harvester 20. As can be seen, the header 28 has a height H1 relative to the ground of the field, with any crop material located above height H1 being chopped by the header 28 and directed toward the feeder 30. This chopping action results in an after cut that trails the header 28 in a direction of movement of the combine harvester 20. As can be seen, the crops can generally be divided into two sections: non-valuable crop material designated as 44, such as MOG, that is located at the bottom of the crops and valuable crop material designated as 46, such as grain, that is located near the top of the crops. As shown in FIG. 1, the header 28 height H1 is preselected so that the cutting surface 40 is located below the valuable crop material 46 to ensure that the valuable crop material 46 is separated from the crops and directed to the feeder 30. The header 28 height H1 can be adjusted by the operator to control how far below the valuable crop material 46 that the cutting surface 40 is located, which will affect the composition of the crop material directed toward the feeder 30 and into the other systems of the combine harvester 20. In this sense, the general proportions of valuable crop material 46 and non-valuable crop material 44 fed into the combine harvester 20 is directly controlled by the operator's adjustment of the header 28 height H1. The operator can also adjust the total throughput of the combine harvester 20 by adjusting the vehicle speed of the combine harvester 20 across the field. If the operator is inexperienced or unsure of the crop conditions in the field, the proportions of valuable crop material 46 to non-valuable crop material 44 directed into the feeder 30 may not be optimal, leading to a loss of harvested valuable crop material 46 or inconsistent MOG distribution on the field through the residue system 36. A non-optimal vehicle speed can lead to overwhelming the threshing, cleaning and residue systems 32, 34, 36 of the combine harvester 20 if the vehicle speed is too fast or inefficient harvesting if the vehicle speed is too slow.

Figure 2:
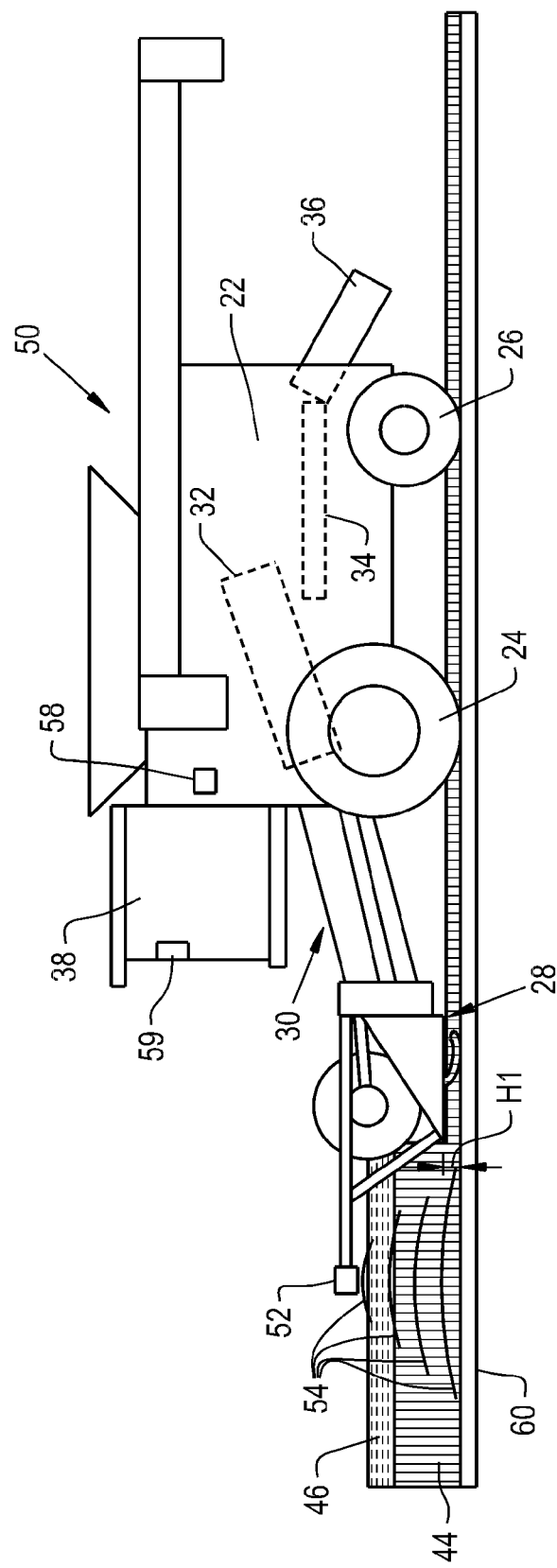
FIG. 2 is a perspective view of an embodiment of an agricultural harvester according to the present invention with a sensor mounted on a cutter of the agricultural harvester.
Figure 3:
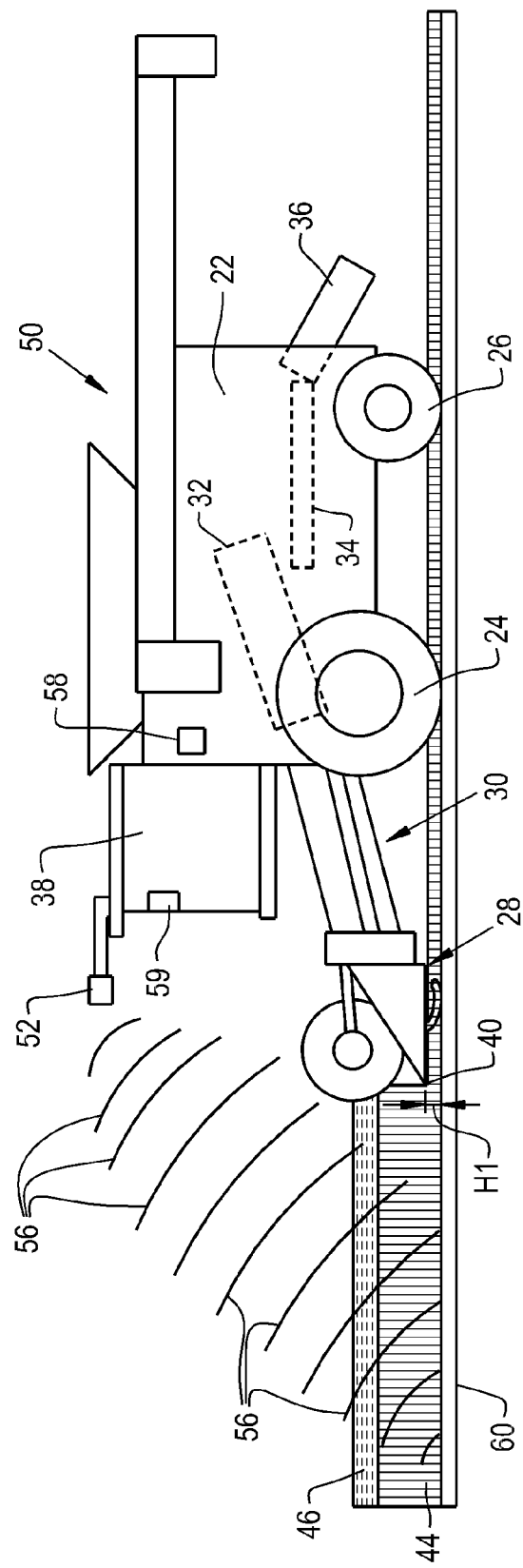
FIG. 3 is a perspective view of the agricultural harvester shown in FIG. 2 with the sensor mounted on a cabin of the agricultural harvester.

Referring now to FIGS. 2-9, a combine harvester 50, structurally similar to the combine harvester 20 shown in FIG. 1, is shown equipped with a sensor 52 that is held by the combine harvester 50. For ease of reference, all components shared between the combine harvester 20 and the combine harvester 50 will have the same reference numerals throughout the figures. The sensor 52 can be any type of sensor capable of emitting sound waves, radio waves, or both and receiving reflected sound waves, radio waves, or both off of objects to determine the relative density of the objects that the sound and/or radio waves have reflected off of. The sensor 52 can be mounted to the header 28 (as shown in FIG. 2), the cabin 38 (as shown in FIG. 3), or any other location on the combine harvester 50 that allows for sound and/or radio waves to be reflected off crops in the path of the header 28. As shown in FIG. 2, the sensor 52 is directed generally perpendicularly to the ground in the path of the header 28, whereas in FIG. 3 the sensor 52 is directed at an angle relative to the ground in the path of the header 28.

Figure 4:
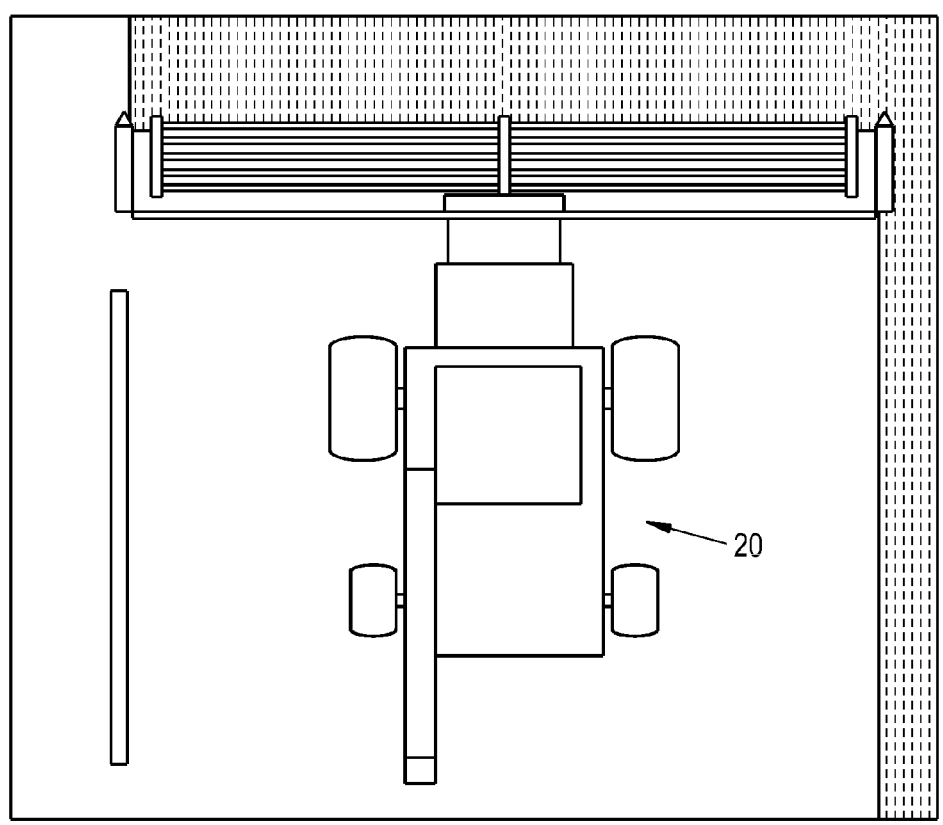
FIG. 4 is a perspective view of a field being harvested by the prior art agricultural harvester shown in FIG. 1.
Figure 5:
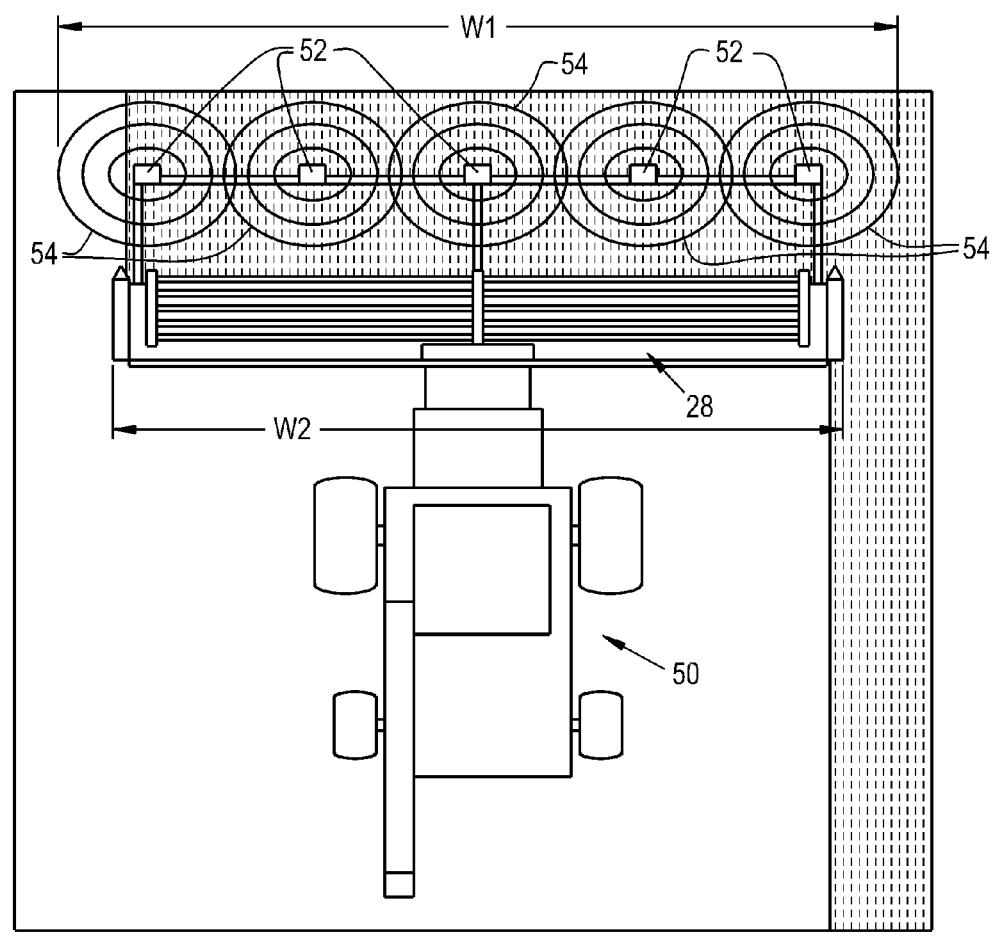
FIG. 5 is a perspective view of a field being harvested by the agricultural harvester shown in FIG. 2.
Figure 6:
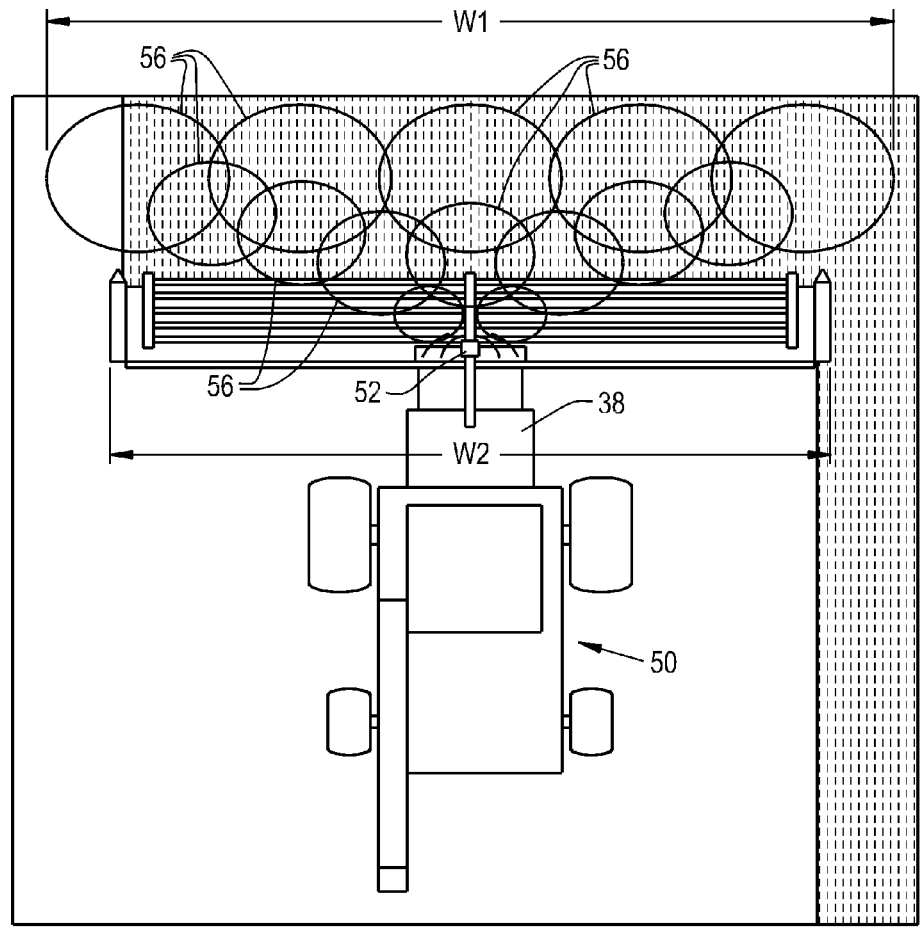
FIG. 6 is a perspective view of a field being harvested by the agricultural harvester shown in FIG. 3.

Referring now to FIGS. 4-6, the combine harvester 20 (shown in FIG. 4) does not collect any data about the field that it is harvesting while the combine harvester 50 (shown in FIGS. 5-6) collects data in differently shaped sensing areas in front of the combine harvester 50. As can be seen in FIG. 4, the combine harvester 20 has left a strip of uncut crops near the side edge of where the header has passed. This strip of uncut crops can be left behind due to the operator not having vision of the crops and missing the crops with the side edge of the header or because the operator has miscalculated the route the combine harvester 20 needs to take to cut all the crops. A finger (not shown) can be attached to the header to try to extend the effective cutting width of the header, but that can miss the strip of uncut crops due not being the proper height to grab the uncut crops.

As can be seen in FIG. 5, when the combine harvester 50 has one or more sensors 52 that are mounted to the header 28 generally perpendicular to the ground, each sensor 52 tends to collect data in a circular area with a center defined by the sensor 52. The sensors 52 can therefore be spaced out so that there is minimal, if any, overlap between emitted and received waves, represented as circles 54. In contrast, when the combine harvester 50 has one or more sensors 52 that are mounted to the cabin 36 and directed toward the ground in the path of the header 28, as shown in FIG. 6, there is significantly more overlap between emitted and received waves, represented as circles 56. Either configuration of sensors 52 can be used according to the present invention, with the main difference between the different configurations being how the received waves are processed, which is described below. It should be noted that either shown configuration allows for data sensing areas to have an effective sensor width W1 that extends at least an entire width W2 of the header 28, and any configuration that allows for such data sensing areas to be achieved is suitable for use. The sensor(s) 52 can be utilized to visualize sections of crops that could be potentially left uncut and allow the operator or combine harvester 50 to properly adjust an operating parameter to make sure that all the uncut crops are cut.

Once the sensor(s) 52 has received reflected sound and/or radio waves, the sensor(s) 52 can produce a plurality of output signals that are sent to an electrical processing circuit (EPC) 58 coupled to the sensor(s) 52. The EPC 58 can be configured as any type of suitable processor that is capable of receiving and analyzing the output signals from the sensor(s) 52, such as a digital controller, an analog processor, hardwired components or an application specific integrated circuit (ASIC). The EPC 58 can be coupled to the one or more sensors 52 in any way that allows the output signals to be sent from the sensor(s) 52 to the EPC 58, such as hardwiring or wireless transmission. The EPC 58 can be located anywhere in or on the agricultural harvester 50 that allows for the EPC 58 to receive the output signals from the sensor(s) 52, with a useful location being within the cabin 38 so that the EPC 58 can provide information to the operator during harvesting operations. The EPC 58 is configured so that once it receives output signals, it produces a field map of the area in front of the header 28 based on the received output signals.

Figure 7:
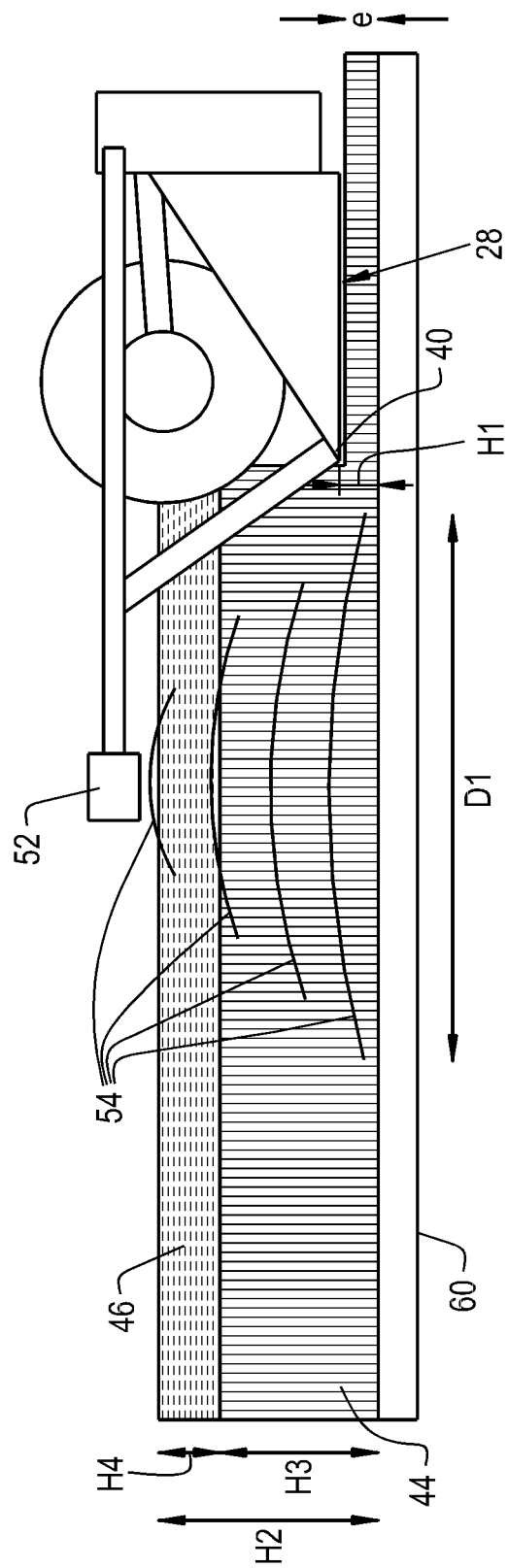
FIG. 7 is a perspective view of a portion of the agricultural harvester shown in FIG. 2 harvesting a field.
Figure 8:
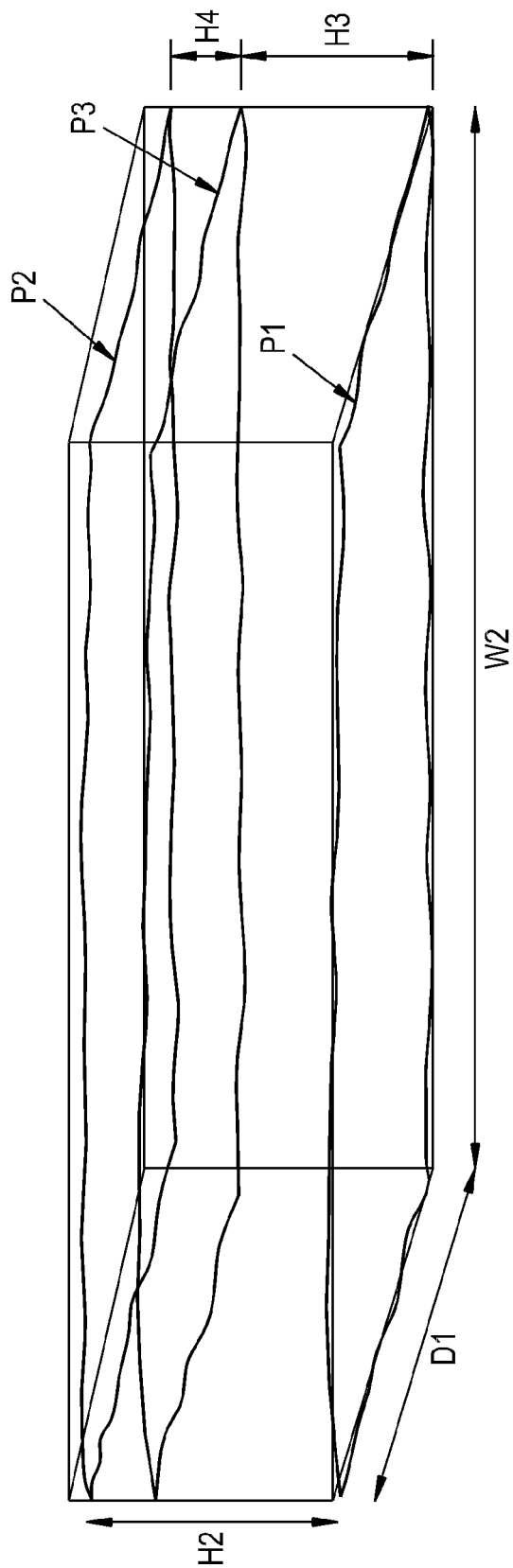
FIG. 8 is a three-dimensional graphical illustration of a field map that can be produced by the agricultural harvesters shown in FIGS. 2-3.
Figure 9:
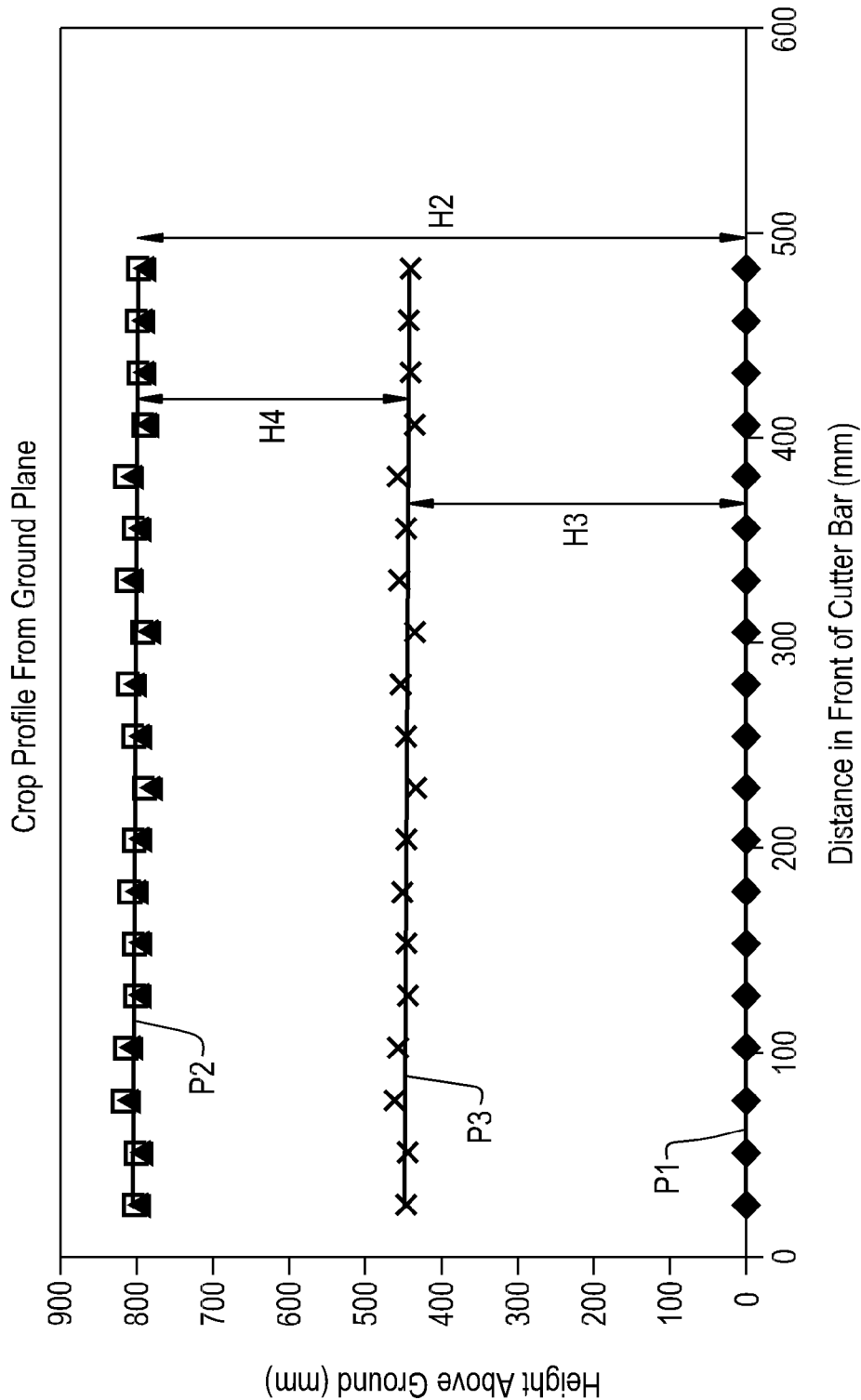
FIG. 9 is a two-dimensional graph of the field map shown in FIG. 8.

Referring now to FIGS. 7-9, a portion of the combine harvester 50 with sensor 52 being directed generally perpendicular to the ground, designated as reference numeral 60, is shown in detail. As can be seen, the waves 54 that are emitted and received by the sensor 52 have a sensor depth D1 that correlates to how large an area in front of the header 28 can be mapped. As can be seen, the mapped area will be between the sensor 52 and the ground 60 up to the sensor depth D1 away from the header 28. Put another way, the agricultural harvester 50 can effectively produce a field map for any area that is within the effective sensor width W1 up to a distance from the header 28 that is equal to the sensor depth D1. As can be seen in FIG. 7, the crops, which are composed of both non-valuable crop material 44 and valuable crop material 46, have a crop height H2. Of crop height H2, the non-valuable crop material 44 has a non-valuable crop height H3, which when referring to grain crops can be referred to as "a stem height," and the valuable crop material 46 has a valuable crop height H4, which when referring to grain crops can be referred to as "a grain height." As can be seen, the grain height H4 is the upper portion of the crop height H2 and the stem height H3 is the lower portion of the crop height H2 adjacent to the ground 60. As the cutting surface 40 with cutting height H1 passes over the crop material, stubble is left behind that is composed of non-valuable crop material 44 and has a stubble height that is approximately equal to the cutting height H1, relative to the ground 60.

The waves 54 from the sensor(s) 52 will travel through the crops to the ground 60, and be reflected back to the sensor(s) 52 from the ground 60. Based on the reflected signal that is received by the sensor(s) 52, data can be collected that is sent to the EPC 58 as output signals from the sensor(s) 52. The output signals sent from the sensor(s) 52 to the EPC 58 can be analyzed to determine information about the crops and ground profile 60, such as the crop height H2, the stem height H3, and the grain height H4. Specifically, the various heights can be determined based on the travel time of the waves 54 through varying densities of the crops, with the densities of the non-valuable crop material 44 and valuable crop material 46 having different values. As is known, sound and radio waves travel faster through denser mediums. The relationship between the speed of the sound or radio wave and the density of the medium it is travelling through can be utilized by the EPC 58 to determine the crop height H2, the stem height H3 and the grain height H4 from the output signals that are received from the sensor(s) 52. In this sense, the EPC 58 can be configured to determine an approaching crop material density of crops that are in the path of the header 28 as it travels across the ground 60, with the area that the sensor(s) 52 obtain data from being a scanned area.

Since the crop height H2, stem height H3 and grain height H4 will tend to vary along the effective sensor width W1, the EPC 58 can average out each height to produce an averaged crop height, an averaged stem height and an averaged grain height across the effective sensor width W1 up to the sensor depth D1. The EPC 58 can also average out heights of the ground 60 to produce a ground profile. The EPC 58 can then produce a field map of the area where data is being collected from by the sensor(s) 52, which is shown in FIGS. 8 and 9. As can be seen in FIG. 8, a three-dimensional field map can be produced that graphically indicates the ground profile as a ground plane P1, the top of the crops as a crop plane P2 and a bottom of the valuable crop material 46 as a grain plane P3. As can be seen, the volume encompassed by the produced three-dimensional field map can have a width that is equivalent to the entire width W2 of the header 28, a height that is equivalent to the crop height H2, and a depth that is equivalent to the sensor depth D1. The field map therefore allows for the system to determine approaching crop and ground conditions and automatically adjust operating parameters of the combine harvester 50. It should be appreciated that the grain plane P3 defines a bottom of where valuable crop material 46 is located in the crops, and that chopping below the height of the grain plane P3, relative to the ground plane P1, will result in non-valuable crop material 44 to be directed into the feeder 30. FIG. 9 shows a two-dimensional graph of the three-dimensional field map shown in FIG. 8. As can be seen, the various points along the field map have been averaged to produce averaged heights relative to the ground 60 at distances from the cutting surface 40, which can be a cutter bar. The EPC 58 can use the averaged values of the grain plane P3 to determine what the height H1 of the header 28 should be that allows for collection of as much valuable crop material 46 as possible while also collecting enough non-valuable crop material 44 to be distributed back on to the field. The EPC 58 can also use the averaged values of the grain plane P3 to adjust the height H1 of the header 28 so that minimal, if any, non-valuable crop material 44 is chopped and directed to the feeder 30, so that mostly valuable crop material 46 is collected by the combine harvester 50.

The produced field map can be stored as data in the EPC 58 but can also be presented to an operator during harvesting to allow the operator to view crop and field conditions, if desired. In this respect, a display 59 can be coupled to the EPC 58 that is capable of displaying a three-dimensional representation of the field map (as shown in FIG. 8), a two-dimensional representation of the field map (as shown in FIG. 9), or both. The display 59 can be coupled to the EPC 58 in any manner that allows for data to be exchanged between the EPC 58 and the display 59. The display 59 can be placed in the cabin 38 so that the operator can view the field maps during the harvesting operation and manually adjust operating parameters of the combine harvester 50 using analog controls, if desired. The display 59 can also be configured to accept input commands from the operator that are transmitted to the EPC 58 to control various operating parameters of the combine harvester 50. An advantage of the three-dimensional representation of the field map produced according to the present invention is that the produced field map gives information about the topography of the field, making the map truly three-dimensional, as opposed to current displays that show two-dimensional views3.

Using the produced field map, the EPC 58 can also determine the throughput of the combine harvester 20 based on the difference between the height H1 of the header 28 and the crop height H2 as well as the vehicle speed of the combine harvester 50. The EPC 58 can further determine how much of the throughput is valuable crop material 46, such as grain, and how much is non-valuable crop material 44, such as MOG, based on the difference between the height H1 of the header 28 and the grain height H4. This determination can then be used to adjust various operating parameters of the combine harvester 50 to optimize harvesting operations at differing points in the field. For example, the throughput can be adjusted by adjusting the vehicle speed of the combine harvester 50 so that there is a constant supply of MOG to the residue system 36, ensuring consistent distribution of MOG back to the field.

The produced field map can also be used to create a GPS map illustrating valuable crop material collection and non-valuable crop material collection at any location in the field that the combine harvester 50 has traveled over, as well as the ground profile across the traveled areas. The GPS map can then be utilized for future reference to program the combine harvester 50 or other combine harvesters that are not equipped with sensors to automatically adjust various operating parameters at specific locations in the field based on known field and crop conditions. The produced GPS map can also be used to determine optimal seeding and fertilizing patterns based on the distribution of crops and ratio of non-valuable crop material to valuable crop material in mapped areas and a topographical map can be produced to keep track of various field characteristics such as erosion. Such GPS maps can be constantly updated by combine harvesters equipped with sensors, allowing for historical trends and data to also be analyzed.

Figure 10:
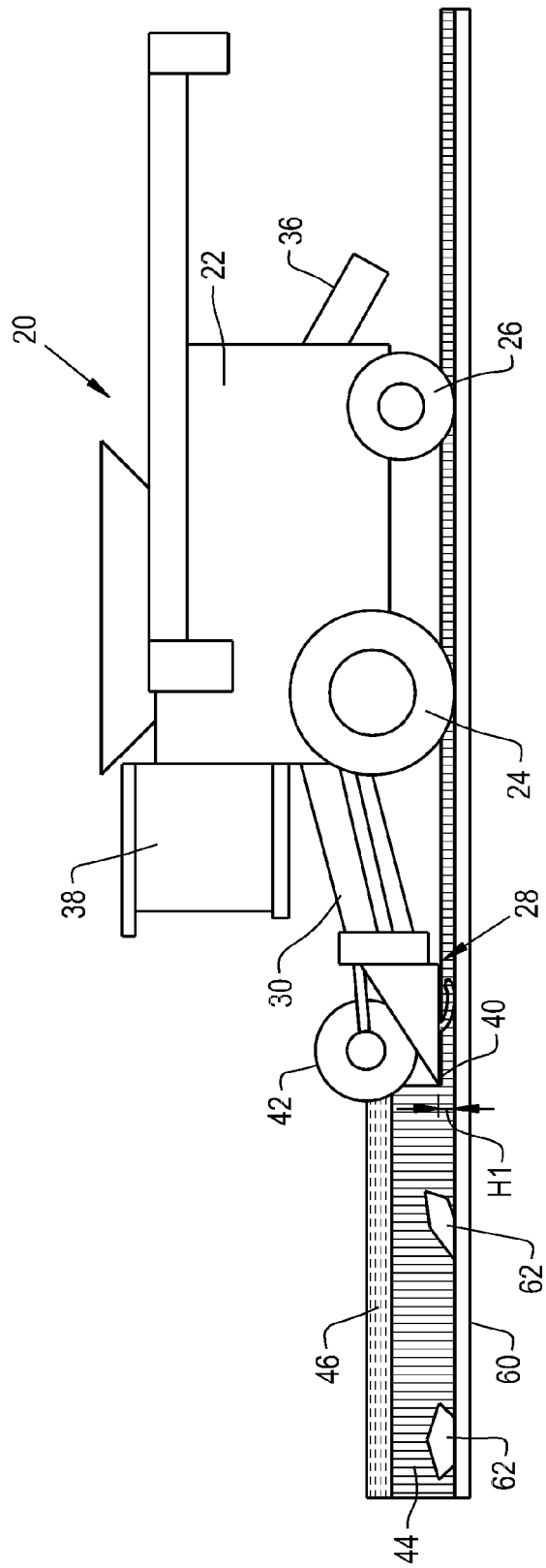
FIG. 10 is a perspective view of the agricultural harvester shown in FIG. 1 harvesting a field and approaching a foreign object.
Figure 11:
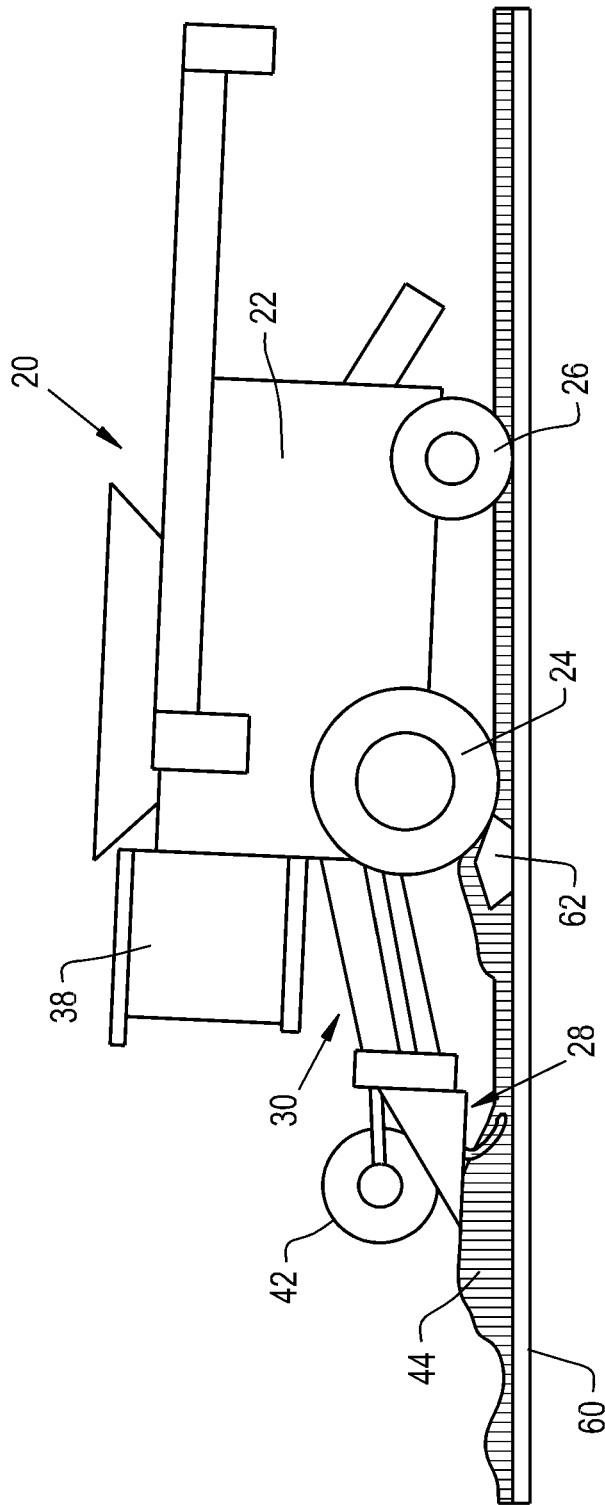
FIG. 11 is a perspective view of the agricultural harvester shown in FIGS. 1 and 10 harvesting a field after passing the foreign object shown in FIG. 10.

While the combine harvester 50 of the present invention has been described as optimizing operating parameters for efficient harvesting, the combine harvester 50 of the present invention 50 can also avoid damage to the cutter 28 from field hazards to decrease the need for costly downtimes and repairs. Referring now to FIG. 10, the prior art combine harvester 20 shown in FIG. 1 is illustrated travelling across a field. As can be seen, there are foreign objects 62, shown as rocks, in the path of the combine harvester 20. Combine harvester 20 is not equipped with sensors that can detect the rocks 62, so unless the operator is aware of the rocks 62 in the path of the combine harvester 20, there is unlikely to be adjustment of the height H1 of the header 28. The header 28 is therefore likely to hit one of the rocks 62, which can damage the cutter bar 40 or other systems of the combine harvester. Even if the cutter bar 40 or systems of the combine harvester 20 are not damaged, the rock(s) 62 can still have a negative effect on harvesting, as shown in FIG. 11. As can be seen, as the front wheel 24 travels over the rock 62, the change in height of the wheel 24 is transmitted to the chassis 22 and ultimately to the header 28, causing a "wave profile" to be cut into the crops. This uneven wave profile cut is undesirable because it can lead to valuable crop material not being collected, an excessive amount of non-valuable crop material to be collected, and can also be unsightly to the landowner.

Figure 12:
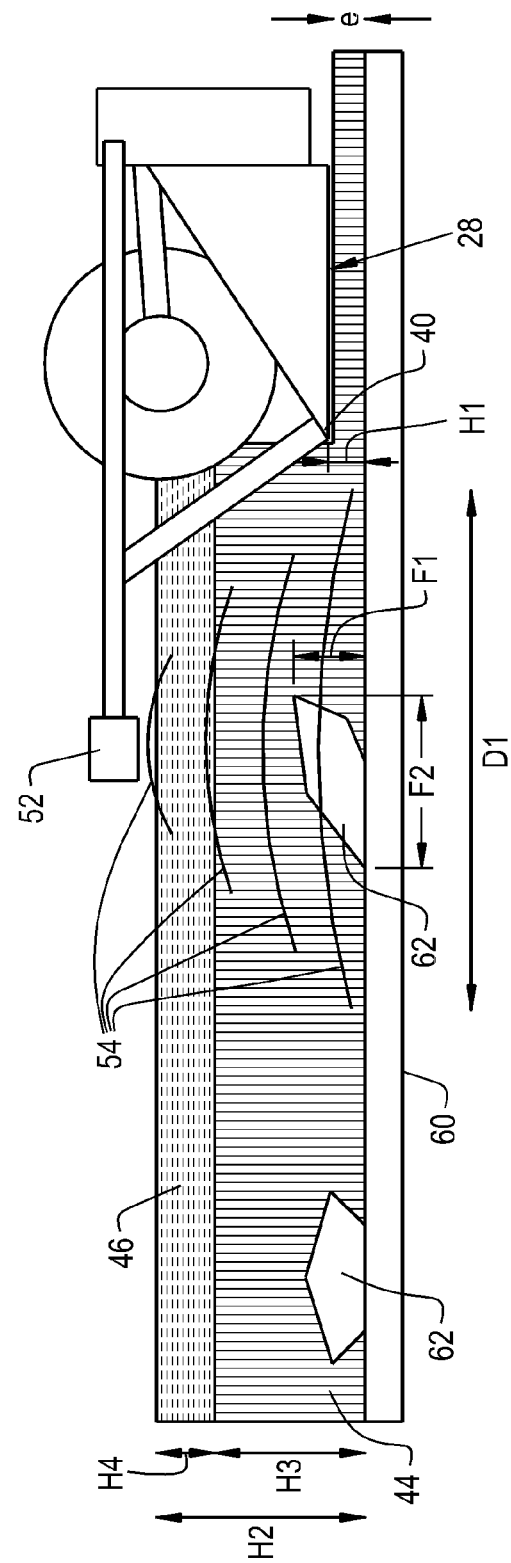
FIG. 12 is a perspective view of a portion of the agricultural harvester shown in FIG. 2 approaching a foreign object.
Figure 18:
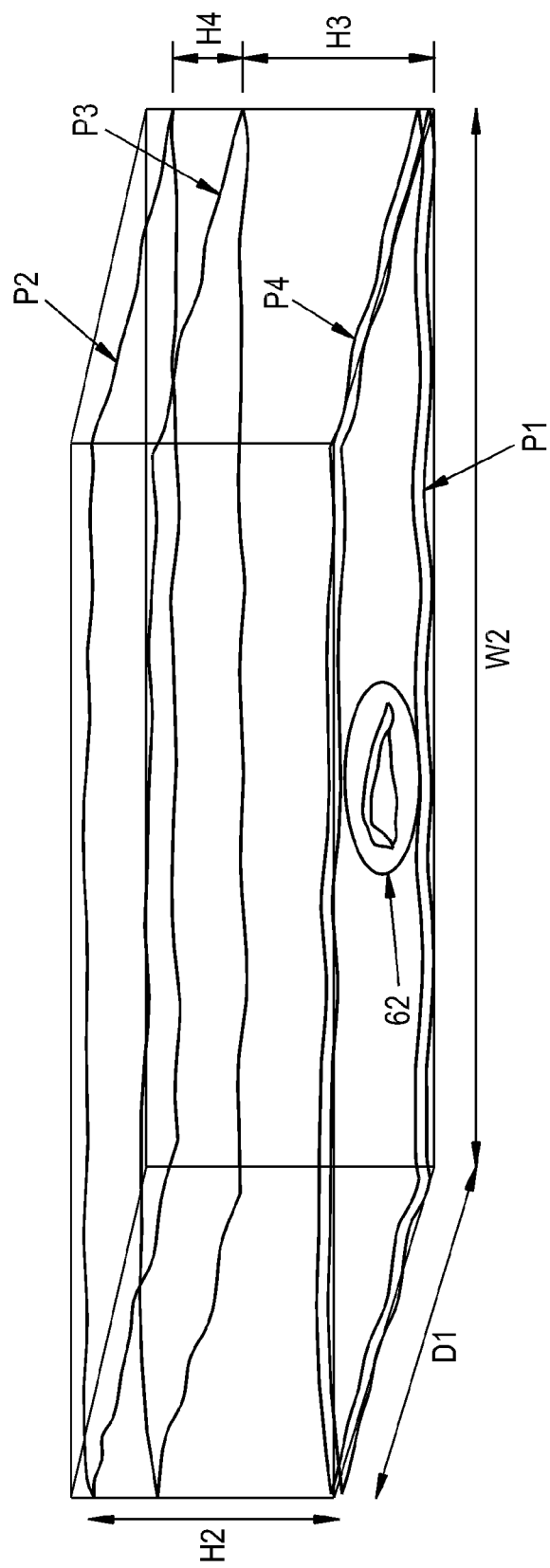
FIG. 18 is a three-dimensional graphical illustration of a field map that can be produced by the agricultural harvesters shown in FIGS. 2-3 as they approach a foreign object.
Figure 19:
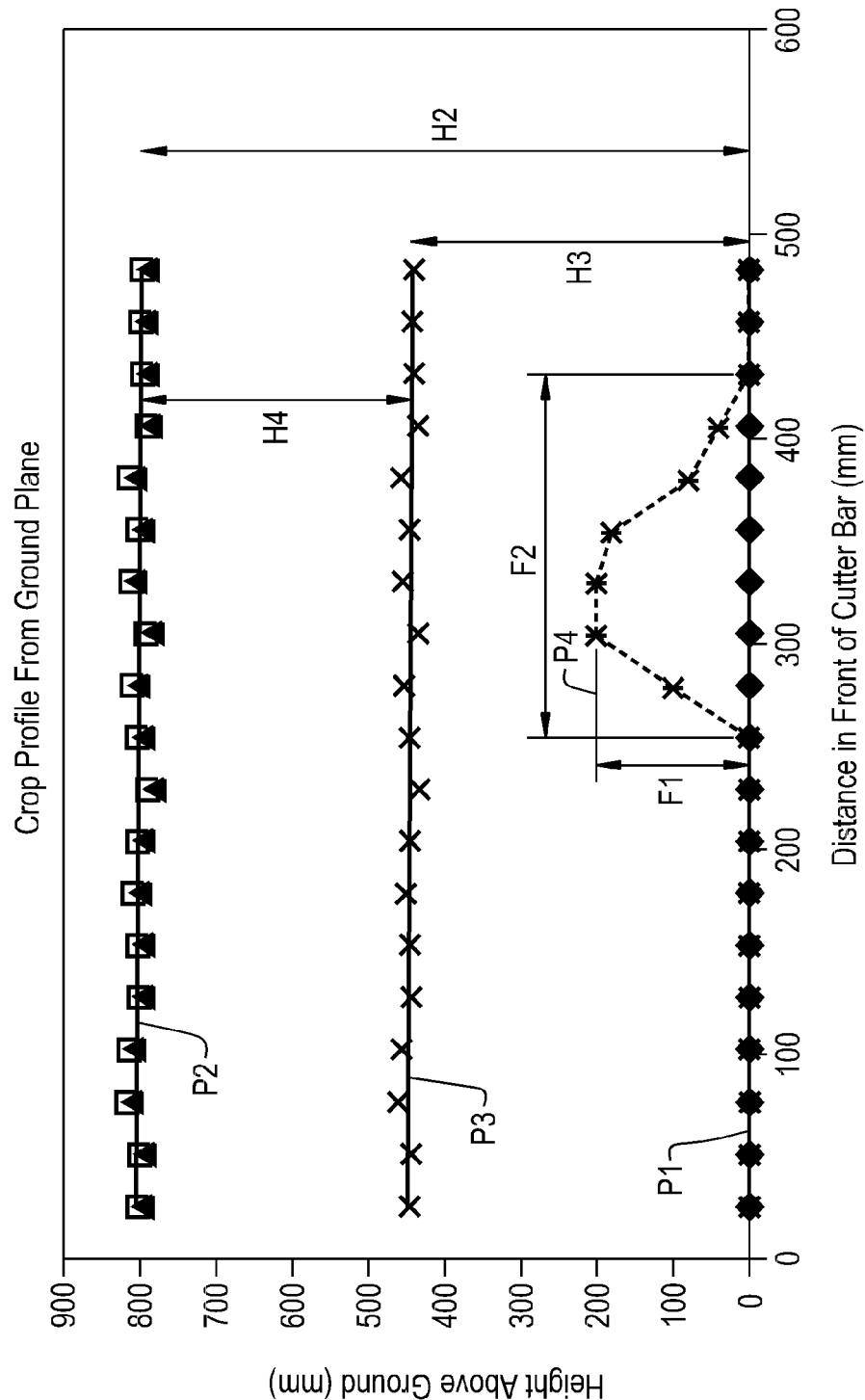
FIG. 19 is a two-dimensional graph of the field map shown in FIG. 18.

Referring now to FIG. 12, the sensor 52 of the combine harvester 50 is shown directed generally perpendicular to the ground 60, similarly to FIG. 7. In addition to determining the crop height H2, the stem height H3 and the grain height H4, the reflected waves 54 from sensor 52 can also detect the foreign objects 62 based on their density difference from the crops, to allow the EPC 58 to determine a relative location of the foreign objects 62 to the header 28 as well as a foreign object height F1 and a foreign object depth F2. The reflected waves 54 can also determine a width of the foreign objects 62 that is shown as extending into the page. From the reflected waves 54, the EPC 58 can produce a three-dimensional field map (shown in FIG. 18) and a two-dimensional representation of the field map (shown in FIG. 19) that can be utilized to adjust operating parameters of the combine harvester 50. As can be seen, the three-dimensional field map and two-dimensional representation in FIGS. 18-19 are similar to those shown in FIGS. 8-9, with the addition of a foreign object plane P4 in FIG. 18 and the foreign object height F1 in FIG. 19 indicating the location and dimensions of the foreign object 62 relative to the header 28. Having the foreign object plane P4 and foreign object height F1 mapped out allows for the EPC 58 to determine when the header 28 will encounter the foreign object 62 in its path and can adjust the positioning of the header 28 accordingly to avoid contact with the foreign object 62 as the header 28 advances.

Figure 13:
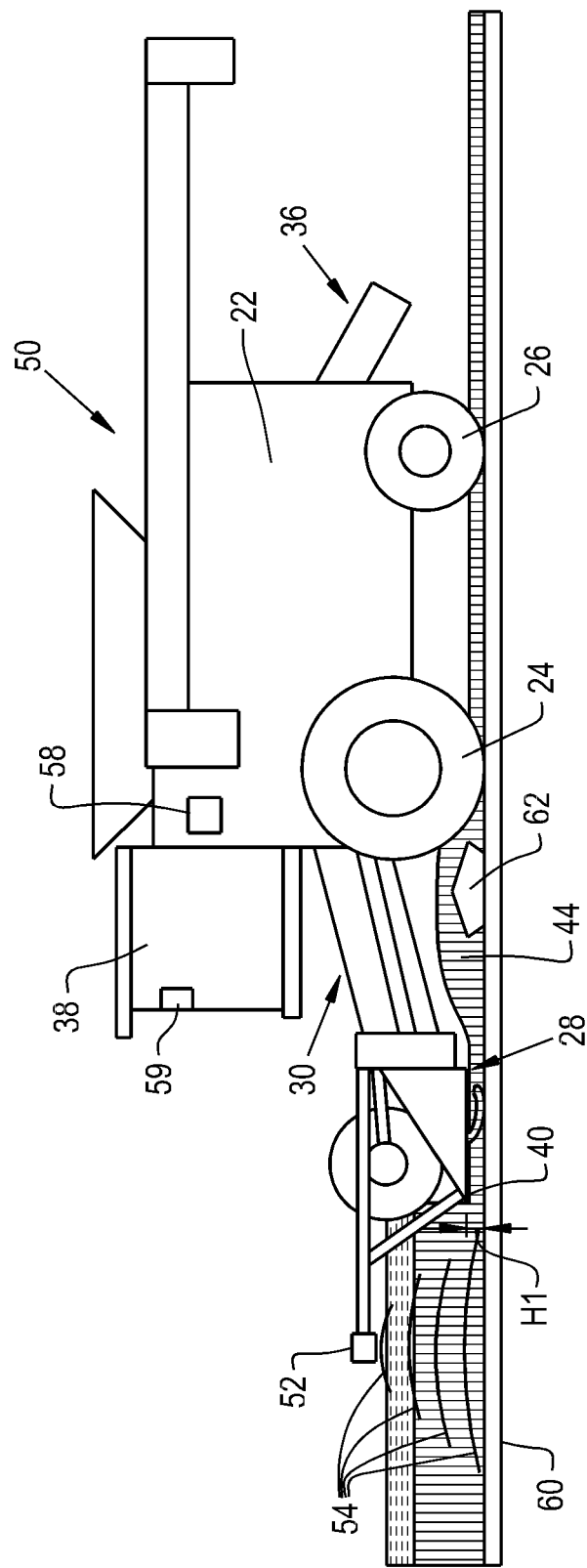
FIG. 13 is a perspective view of the agricultural harvester shown in FIGS. 2 and 12 harvesting a field after passing over the foreign object shown in FIG. 12.
Figure 14:
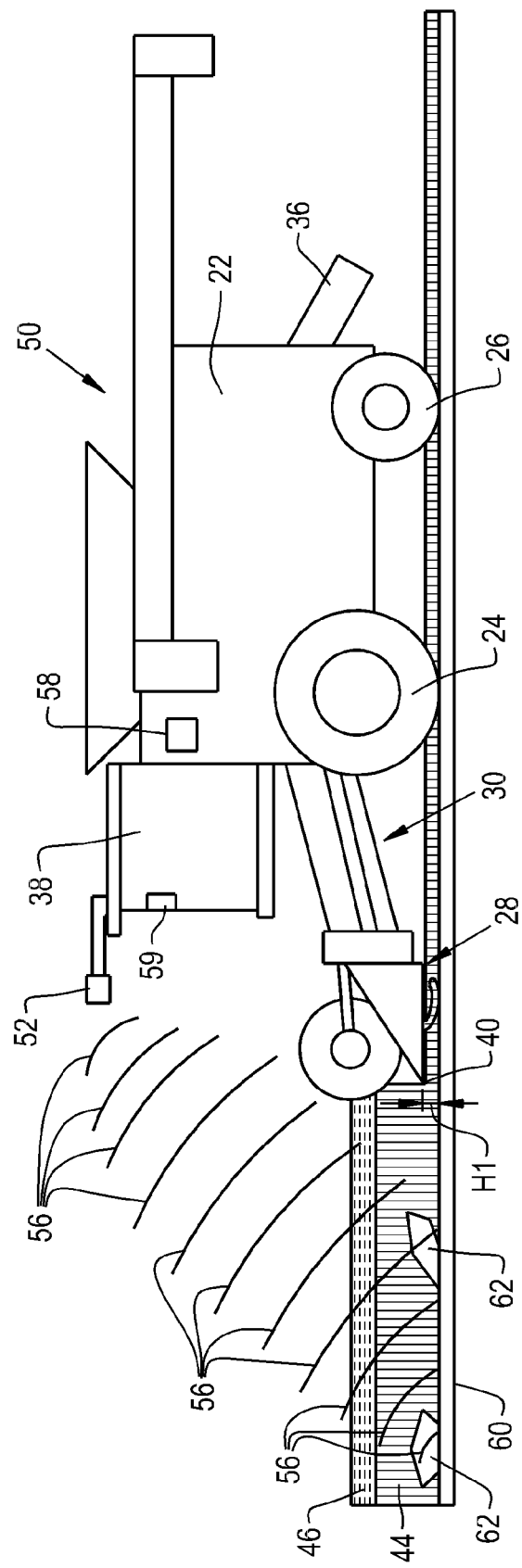
FIG. 14 is a perspective view of the agricultural harvester shown in FIG. 3 harvesting a field and approaching a foreign object.

For example, the foreign object plane P4 can be set as the maximum height of the foreign object 62, corresponding to the foreign object height F1, so that the height H1 of the header 28 is set to be above the foreign object plane P4 and will not contact the foreign object 62 as it passes over the location of the foreign object 62. Once the header 28 has passed the foreign object 62, the EPC 58 can also determine the relative position of the foreign object 62 to each of the wheels 24, 26 of the combine harvester 50 to determine when the wheels 24, 26 will pass over the foreign object 62. As the wheels 24, 26 pass over the foreign object 62, the chassis 22 of the combine harvester 50 will tend to raise in response, which can also raise the header 28 inadvertently. The EPC 58 can therefore determine when the wheels 24, 26 will pass over the foreign object 62 and how much the wheels 24, 26 will raise as they scale the foreign object height F1 to adjust the relative position of the header 28 to the chassis 22 to a compensating height. In this respect, the EPC 58 signals for the header 28 to be lowered as the wheels 24, 26 initially scale the foreign object 62, increasing the height of the chassis 22 relative to the ground 60, and signals for the header 28 to be raised as the wheels 24, 26 pass over the foreign object 62 and return to the ground 60, returning the height of the chassis 22 to its normal height relative to the ground 60. By adjusting the height H1 of the header 28 to the compensating height, the combine harvester 50 can maintain a uniform after cut, designated as area A1 of FIG. 13, after encountering the foreign object 62. FIG. 14 illustrates the combine harvester 50 with sensor(s) 52 mounted to the cabin 38 and directed at an angle in front of the header 28, but the principles of adjusting the operating parameters of the combine harvester 50 using a produced field map and in response to the foreign objects 62 is similar to the configuration shown in FIG. 12.

In some instances, it may not be efficient to adjust the height H1 of the entire header 28 in response to differing crop conditions or hazards in the field, since the entire header 28 is a relatively heavy piece of equipment. In instances where a quick adjustment is needed, it also may be difficult to adjust the entire header 28 due to this relatively high weight. In such instances, individual components of the header 28 can be adjusted to account for differing crop conditions or to avoid hazards present in the field.

Figure 15:
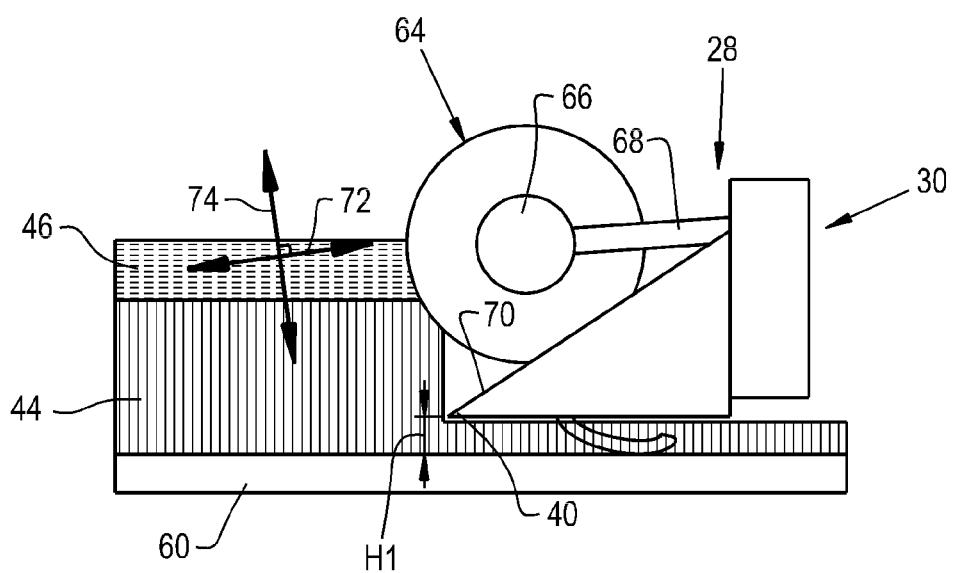
FIG. 15 is a perspective view of a cutter of the agricultural harvesters shown in FIGS. 2 and 3 with portions broken away.

Referring now to FIG. 15, the header 28 of combine harvester 50 is shown with an adjustable header reel 64. The header reel 64 is cylindrically shaped and rotates about a mounting 66 to direct crop material toward the cutting surface 40, shown as a cutter bar, of the header 28. The adjustable header reel 64 is mounted to the header 28 so that its relative position on the header 28 can be adjusted by an actuator 68 that is controlled by the EPC 58. The actuator 68 can be any type of actuator that allows for moving the header reel 64 and can be powered by the hydraulic, mechanical or electrical systems of the combine harvester 20. Since the header 28 has an angled upper surface 70, the adjustable header reel 64 can be controlled to have a range of movement, signified by arrows 72 and 74, with extension in the x-direction (signified by arrows 72) angled relative to the cutter bar 40 and extension in the y-direction (signified by arrows 74) perpendicular to extension in the x-direction. Adjusting the relative position of the header reel 64 to the header 28 and cutter bar 40 can help control the throughput of the harvest combine 50 by selectively controlling the amount of crop material that is directed toward the cutter bar 40 and feeder 30. For example, if the EPC 58 detects that the throughput of the combine harvester 50 is too high, the EPC 58 can signal for the header reel 64 to be adjusted so that it directs less crop material toward the cutter bar 40, allowing for the throughput to be lowered and to avoid overwhelming the threshing system 32, cleaning system 34, or residue system 36. As shown, the header reel 64 will rotate in a counter-clockwise direction so that the crop material is directed toward the cutter bar 40. The header reel 64 has a rotational speed as it rotates, which can be controlled by the EPC 58 to increase or decrease in response to crop conditions. For example, if the throughput of the combine harvester 50 is too low, the rotational speed of the header reel 64 can be adjusted so that it directs a greater amount of crop material toward the cutter bar 40 so that the throughput of the combine harvester 50 is increased. These examples of conditions for adjusting the header reel 64 are given only to illustrate possible scenarios where such adjustments would be useful and are not intended to limit the conditions in which the header reel 64 can be adjusted and how the header reel 64 is adjusted according to the present invention.

Referring now to FIGS. 16 and 17, the header 28 of the combine harvester 50 is shown with a flexible cutter bar 76 that can be controlled by the EPC 58. As can be seen in FIG. 16, there is no object in the path of the header 28 so the flexible cutter bar 76 remains relatively unflexed as the combine harvester 50 travels across the field. Referring now to FIG. 17, a foreign object 78, shown as a small rock, is in the path of the header 28 with a foreign object height F3 that is relatively small. In such a case, adjusting the height H1 of the entire header 28 would be inefficient due to the relatively small adjustment being made to the heavy header 28. Instead, the EPC 58 can determine that the foreign object height F3 is below a threshold value that corresponds to a height of an object that requires the height H1 of the entire header 28 to be adjusted. The threshold value can be a maximum flex value, represented as reference numeral 80, of the flexible cutter bar 76, so that when any foreign object is approached with a foreign object height below the maximum flex value 80 of the flexible cutter bar 76, the EPC 58 can signal for the flexible cutter bar 76 to be flexed to its maximum flex value 80 so that the flexible cutter bar 76 does not contact the foreign object, as shown in FIG. 17. Flexing the flexible cutter bar 76 to avoid the foreign object 78, rather than adjusting the position of the entire header 28, allows for less energy to be used to avoid the foreign object and allows for a quicker response due to the relatively low energy requirements needed to flex the flexible cutter bar 76.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester, comprising:
a chassis;
at least one ground engaging traction member held by said chassis;
a cutter held by said chassis;
a sensor held by said agricultural harvester so that said sensor is directed in front of said cutter and configured to emit and receive at least one of sound and radio waves and produce a plurality of output signals; and
an electrical processing circuit coupled to said sensor, said electrical processing circuit configured to produce a field map which indicates a bottom of a grain plane from said plurality of output signals and adjust an operating parameter of said agricultural harvester based on said field map.

2. The agricultural harvester according to claim 1, further comprising a display coupled to said electrical processing circuit that is configured to produce at least one of a two-dimensional and three-dimensional representation of said field map.

3. The agricultural harvester according to claim 1, wherein said electrical processing circuit is configured to determine an approaching crop material density from said plurality of output signals.

4. The agricultural harvester according to claim 3, wherein said electrical processing circuit is configured to adjust a height of said cutter based on said approaching crop material density.

5. The agricultural harvester according to claim 1, wherein said electrical processing circuit is configured to detect an approaching foreign object from said plurality of output signals.

6. The agricultural harvester according to claim 5, wherein said electrical processing circuit is configured to raise said cutter above said approaching foreign object before said cutter contacts said approaching foreign object and lower said cutter after said cutter has passed said approaching foreign object.

7. A method of controlling an agricultural harvester, comprising:
providing a sensor mounted to said agricultural harvester that is directed toward an area in front of a cutter of said agricultural harvester;
emitting at least one of radio and sound waves from said sensor;
receiving said at least one of radio and sound waves;
producing a field map which indicates a bottom of a grain plane based on said received at least one of radio and sound waves; and
adjusting an operating parameter of said agricultural harvester based on said produced field map.

8. The method according to claim 7, wherein said produced field map further indicates at least one of a ground profile and a top of a crop plane.

9. The method according to claim 8, wherein said ground profile, said bottom of said grain plane, and said top of said crop plane are each produced based on a respective averaged height.

10. The method according to claim 7, wherein said adjusted parameter is a cutting surface height of said cutter, said cutting surface height being adjusted to stay one of at and below said bottom of said grain plane.

11. The method according to claim 7, wherein said field map further indicates at least one crop density in a scanned area.

12. The method according to claim 11, wherein said adjusted parameter is a throughput of said agricultural harvester, said throughput being adjusted to a preselected value based on said at least one crop density.

13. The method according to claim 12, wherein said throughput is adjusted by adjusting an operating speed of said agricultural harvester.

14. The method according to claim 13, wherein said cutter is a header including a header reel and said operating speed is a rotational speed of said header.

15. The method according to claim 11, wherein said cutter is a header including a header reel and said adjusted operating parameter is a position of said header reel relative to said header, said position of said header reel being adjusted based on said throughput of said agricultural harvester.

16. The method according to claim 7, wherein said produced field map further indicates a location and a height of a foreign object relative to said agricultural harvester.

17. The method according to claim 16, wherein said adjusted parameter is a cutting surface height of said cutter, said cutting surface height being adjusted to go above said height of said foreign object as said cutter approaches said location of said foreign object.

18. The method according to claim 17, further including the step of returning said cutting surface height below said height of said foreign object automatically after said cutter has passed said location of said foreign object.

19. The method according to claim 18, further including the step of lowering said cutting surface height to a compensating height automatically as said agricultural harvester passes over said foreign object.

20. The method according to claim 17, wherein said cutting surface height is a height of a cutter bar of said cutter and said height of said cutter bar is adjusted by flexing said cutter bar.

* * * * *